Patented Sept. 16, 1930

1,776,039

UNITED STATES PATENT OFFICE

JOSEF METZGER, OF HALLE-ON-THE-SAALE, AND ALFRED KREUTZER AND THEODOR HELLTHALER, OF GRANSCHUTZ, GERMANY, ASSIGNORS TO THE FIRM A. RIEBECK'SCHE MONTANWERKE AKTIENGESELLSCHAFT, OF HALLE-ON-THE-SAALE, GERMANY

REFINING OF LOW-BOILING HYDROCARBONS

No Drawing. Application filed April 30, 1926, Serial No. 105,856, and in Germany June 10, 1925.

This invention relates to the refining of low-boiling hydrocarbons. The method of refining such materials with concentrated or diluted sulphuric acid or other condensating agents furnishes in most cases no satisfactory results, the refined products being unsatisfactory as to color, smell and stableness with respect to light. The desulphurization is likewise insufficient in most cases, and this results in such products burning badly in the internal combustion engine and causing the separation of carbonaceous residues.

The reason why the refining by means of sulphuric acid and other refining agents fails is by far less attributable to an insufficient action of these agents than to the incomplete separation of the resins formed thereby. Even after the separation of the resins an oil treated with sulphuric acid shows in most cases a typical acid-resin smell which is due to the fact that certain products of the reaction between sulphuric acid and oil remain dissolved in the latter. By subsequent washing and lixiviating of the oil a part of the sulphuric acid reaction products is decomposed so that the free acid may be washed out, it is true, but the oily component of the acid resin is reincorporated with the oil and cannot be wholly removed therefrom even by subsequent distillation. Thus a certain quantity of easily polymerizing substances always remains in the refined product and acts so as to diminish its value by the above-mentioned drawbacks which are especially annoying in the case of the highly unsaturated cracked benzines.

Now we have found that the acid-resins are by far more perfectly separated, and accordingly the final refined products will show correspondingly better properties if the oils are treated with condensating agents, especially sulphuric acid in presence of small quantities of aldehydes, or polymerized products thereof, such as paraldehyde, or substances capable of splitting off aldehyde, such as methylal $CH_2(OCH_3)_2$. Especially the addition of paraldehyde has proved to be very useful in refining oils with sulphuric acid.

The treatment may be carried out in different ways, for instance, the aldehyde may be added to the oil before the refining operation and then the oil may be treated with sulphuric acid in the usual way; or the aldehyde may be gradually run into the mixture of sulphuric acid and oil contained in a mixer. The further treatment is carried out in the well-known manner. After letting the mixture set the oil is separated from the resins produced, washed or lixiviated, and finally subjected to distillation with or without live steam, after completion of which a slight residue is left. We have ascertained that by following this method not only the resins formed are practically entirely separated but also even the malodorous sulphurous substances, as well as unsaturated unstable compounds, which would cause incrustations of the motor cylinders, are more completely removed from the oil than by means of sulphuric acid alone.

The herein described method may be advantageously combined with other known refining processes, preferably by making the latter precede the treatment with sulphuric acid and aldehyde. In this way the aldehyde will be especially utilized for removing the impurities which are separated in the usual way with difficulty.

The proportions of the aldehyde employed depend on the nature of the oil under treatment; generally proportions of from 0.1 to 1 per cent of aldehyde may be used. The temperatures may be the same as when sulphuric acid alone is employed.

Our improved process may be applied to the low-boiling hydrocarbons extracted from mineral oil, to natural gasoline, petrol benzine, especially cracked benzine, and to light oils obtained by distillation of coal, oil-shale and other bituminous materials.

Examples

1. Raw cracked benzine, obtained by pyrogenous decomposition of a high-boiling petroleum-oil fraction, containing 0.35 per cent of sulphur, dark-colored and malodorous was intensively stirred during 3 hours at ordinary temperature with 2 per cent of concentrated sulphuric acid, 0.4 per cent of paraldehyde being added by drops. The dark acid-resins settled perfectly after short standing and were removed. The oil was, without further treatment, light yellow, perfectly clear and did not have any smell whatever of acid-resins. After short washing with water and subsequent lixiviating with soda solution for removing any traces of free acid the benzine was subjected to distillation with steam. Only a small residue was left, and the distillate formed an oil as clear as water stable with respect to light and having a pleasant odor. It contained only 0.14 per cent of sulphur.

The same raw oil treated in a corresponding manner, but without the addition of aldehyde, furnished a refined oil of which only 80 per cent distilled off colorless, whereas the other portions distilled with dark yellow color.

2. A cracked malodorous benzine containing 0.3 per cent of sulphur was treated in the well known manner during 2 hours with concentrated sulphuric acid. The acid-resins having settled and having been drawn off the oil was again stirred for 2 hours with 2 per cent of concentrated sulphuric acid, but this time under gradual addition of 0.3 per cent of paraldehyde at about 50° C. and with careful reflux-condensing. After removal of the resins, washing and lixiviation the oil was blown off with steam. The resulting refined oil was colorless, stable with respect to air and of pleasant odor. It contained 0.11 per cent of sulphur.

3. Raw malodorous light oil obtained from the gases produced by distilling brown-coal, containing 2.5 per cent of sulphur, was at first stirred for 2 hours in the usual manner with 4 per cent of concentrated sulphuric acid. After separation of the resins formed 0.2 per cent of paraldehyde, and thereafter, under stirring, 2 per cent of concentrated sulphuric acid were added to the oil. Thereupon the oil was separated from the resins, washed with water and then with alkali solution and finally subjected to distillation. Thus a colorless product smelling like benzine was obtained containing only 1.0 per cent of sulphur.

By repeating the treatment with aldehyde the percentage of sulphur in the oils may be further reduced. We wish to accentuate that, without departing from the area of our invention, the aldehyde may be replaced by substances which, under the conditions in question, split off or are transformed to aldehyde, so that in fact aldehyde will be present.

We claim:

1. The process of refining low-boiling hydrocarbons comprising treating the hydrocarbons with concentrated sulphuric acid in presence of a quantity of an aldehyde not exceeding 1 per cent. of the hydrocarbons under treatment.

2. The process of refining low-boiling hydrocarbons comprising treating the hydrocarbons with concentrated sulphuric acid and thereafter with a refining agent in presence of a quantity of an aldehyde not exceeding 1 per cent of the hydrocarbons under treatment.

3. The process of refining low-boiling hydrocarbons comprising treating the hydrocarbons with concentrated sulphuric acid and thereafter with concentrated sulphuric acid in presence of a quantity of an aldehyde not exceeding 1 per cent. of the hydrocarbons under treatment.

4. The process of refining low-boiling hydrocarbons comprising treating the hydrocarbons with sulphuric acid in presence of a quantity of an aldehyde not exceeding 1 per cent of the hydrocarbons under treatment, removing the separated products from the hydrocarbons by settling and distilling the hydrocarbons.

5. The process of refining low-boiling hydrocarbons comprising treating the hydrocarbons with sulphuric acid and thereafter with a refining agent in presence of a quantity of an aldehyde not exceeding 1 per cent. of the hydrocarbons under treatment, removing the separated products from the hydrocarbons by settling, and distilling the hydrocarbons.

6. The process of refining low-boiling hydrocarbons comprising treating the hydrocarbons with concentrated sulphuric acid and thereafter with concentrated sulphuric acid in presence of a quantity of an aldehyde not exceeding 1 per cent. of the hydrocarbons under treatment, removing the separated products from the hydrocarbons by settling, and distilling the hydrocarbons.

7. The process of refining low-boiling hydrocarbons, comprising treating the hydrocarbons with concentrated sulphuric acid in presence of a substance capable of forming, under the said conditions, an aldehyde in quantity not exceeding 1 per cent. of the hydrocarbons under treatment.

8. The process of refining low-boiling hydrocarbons, which comprises introducing into the hydrocarbons a substance yielding an aldehyde in quantity not exceeding 1 per cent. of the hydrocarbons under treatment, treating the hydrocarbons with the resulting aldehyde together with concentrated sulphuric acid, and removing the separated products from the hydrocarbons by settling.

In testimony whereof we affix our signatures.

JOSEF METZGER.
ALFRED KREUTZER.
THEODOR HELLTHALER.